March 31, 1964 RENÉ-PHILIPPE JACCARD 3,126,700
TIME METER
Filed Sept. 29, 1961 3 Sheets-Sheet 1
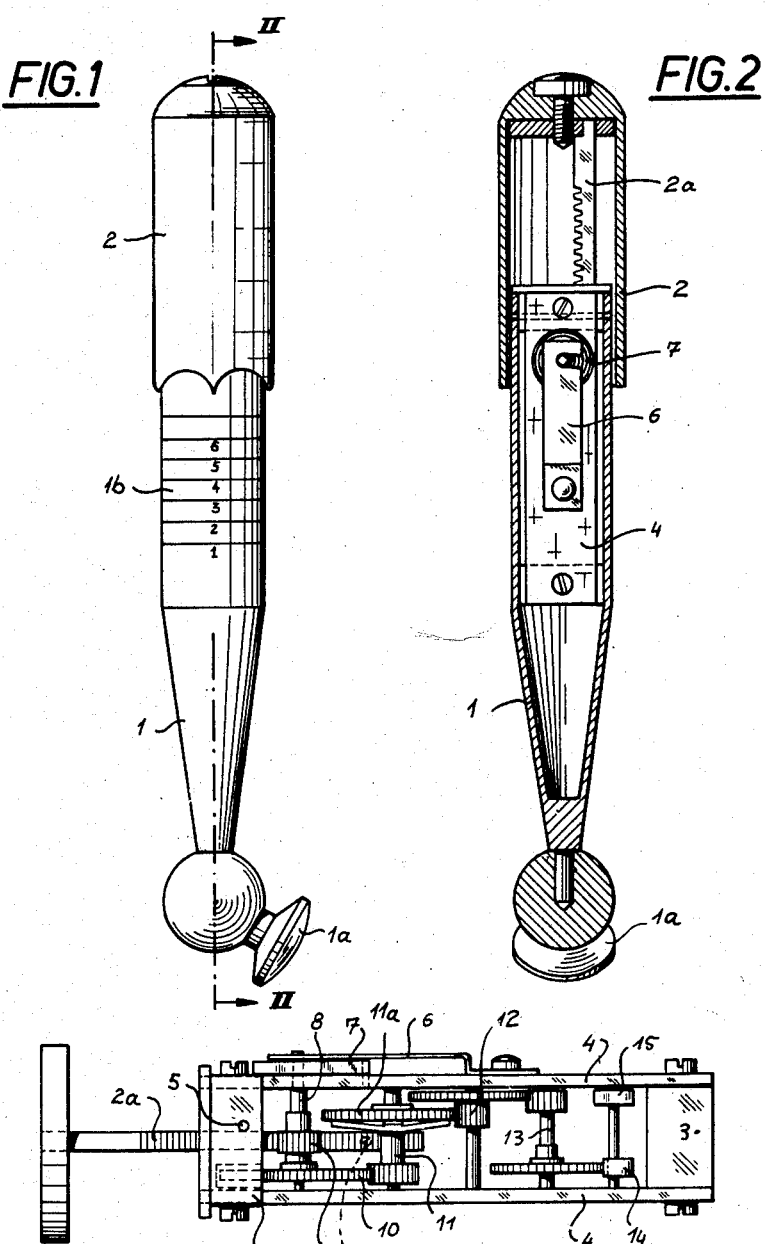

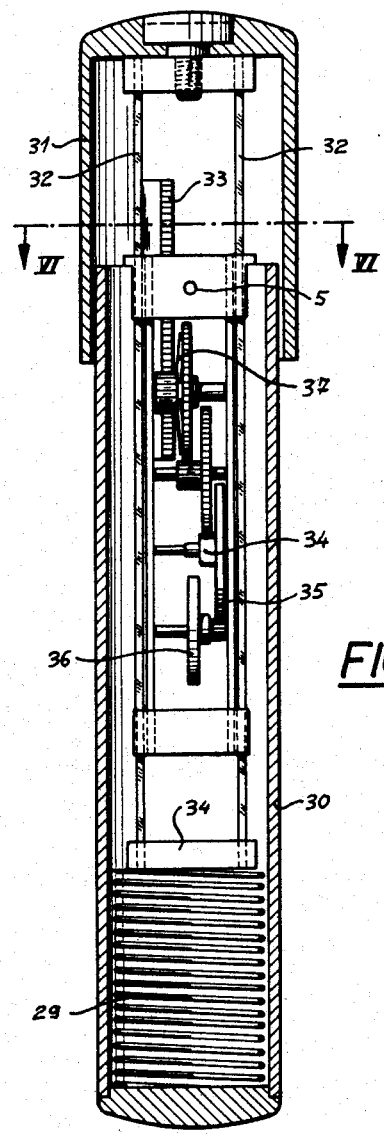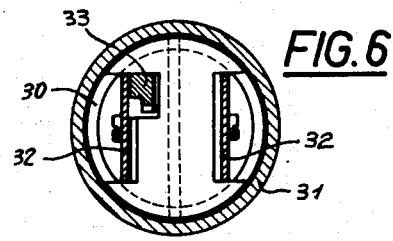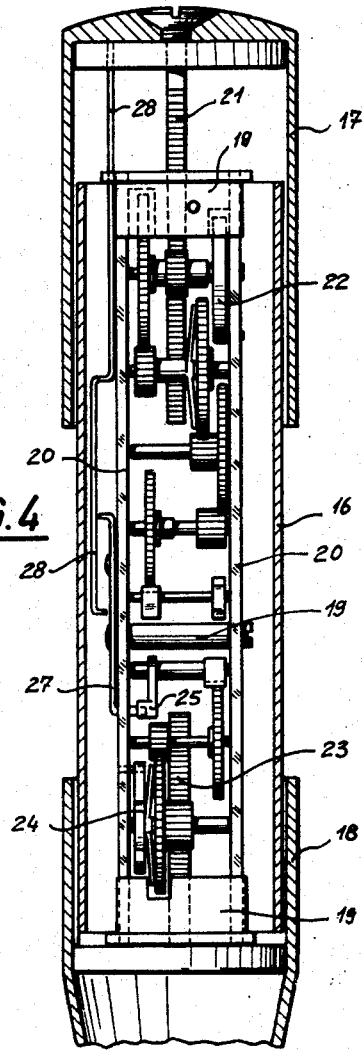

March 31, 1964 RENÉ-PHILIPPE JACCARD 3,126,700
TIME METER
Filed Sept. 29, 1961 3 Sheets-Sheet 3

United States Patent Office 3,126,700
Patented Mar. 31, 1964

3,126,700
TIME METER
René-Philippe Jaccard, Petit-Lancy, Geneva, Switzerland, assignor to Samuel Jack Kaufman, New York, N.Y.
Filed Sept. 29, 1961, Ser. No. 141,756
2 Claims. (Cl. 58—21.13)

My invention has for its object a time meter which allows operating the call dial of a telephone and simultaneously recording the duration of a telephone conversation following the call.

In the accompanying drawing illustrating by way of example five preferred embodiments of such a time meter;

FIG. 1 is an elevational view of a first embodiment;

FIG. 2 is an axial cross-section thereof and

FIG. 3 a longitudinal cross-section perpendicular to the plane of FIG. 2, showing the actual mechanism contained in the instrument;

FIG. 4 is an axial cross-section of the second embodiment;

FIG. 5 is a similar axial cross-section of the third embodiment, FIG. 6 being a cross-section through line VI—VI of FIG. 5.

Figure 7:
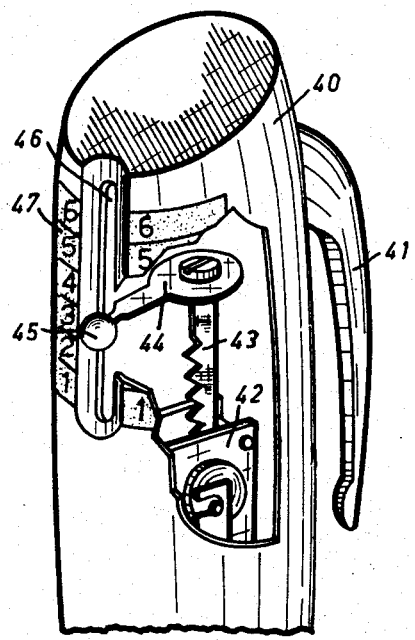
Figure 8:
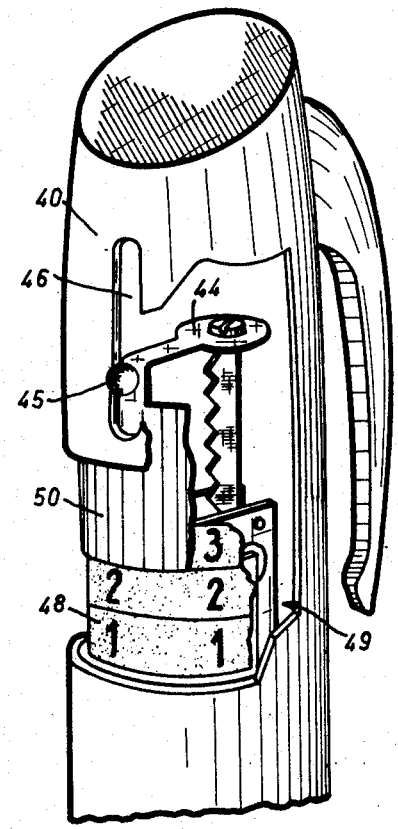

Lastly FIGS. 7 and 8 are partial perspective views of the fourth and fifth embodiments respectively.

The embodiment illustrated in FIGS. 1 to 3 includes a main tube 1 terminating at its lower end with a knob 1a which may be fitted in one of the apertures of a call dial on a telephone apparatus. Over the upper end of said tube 1 may slide longitudinally the secondary tube 2 inside which is secured longitudinally a rack 2a. Inside the tube 1 is fitted a frame comprising two crossmembers 3 and two longitudinal plates 4; said frame is secured to the tube 1 through the agency of a pin which is not illustrated, passing through an opening 5 in one of the crossmembers 3 and the wall of the tube 1. To the outer surface of one of the plates 4 is secured an auxiliary plate 6 and between the latter and the plate 4 is arranged the spiral-shaped driving spring 7; one end of said spring is secured to the frame and the other to a spindle 8 revolvably carried by the frame; said spindle is rigid with a pinion 9 meshing with the rack 2a and with a wheel 10 controlling the gear 11, of which the wheel 11a is fitted with slight friction over its spindle; said gear controls the gear 12 which controls in its turn the gear 13; the wheel of the latter is an escape wheel cooperating with an oscillating lever 14 which forms with the weight 15 the regulator system.

During use, the time-meter appears as shown in FIG. 1, as soon as it has served for rotating the call dial. As soon as the call has been actually obtained, it is sufficient to push the secondary tube 2 over the tube 1; the rack 2a winds then the spring 7 through the pinion 9, the regulator not being influenced by reason of the slightly frictional mounting of the wheel 11a. This being done, the secondary tube is released and the spring 7 expands, under the control of the regulator, so as to push the secondary tube outwardly through the agency of the rack. When the conversation is at an end, it is possible to read its duration on the scale of minutes 1b formed on the main tube to register with the edge of the slidable secondary tube.

The rack 2a carries a small pin 2b (FIG. 3) which engages, when the rack approaches the end of its stroke, the crossmembers 3, so that it remains in engagement with the pinion 9. It is also possible to provide, instead of said pin on the secondary tube 2, a stop adapted, at the end of the stroke of the rack, to engage a corresponding stop on the main tube 1, the slight shock thus produced drawing the attention of the person using the instrument.

The embodiment illustrated in FIG. 4 distinguishes from the preceding embodiment through the fact that each end of the main tube 16 carries slidingly a secondary tube, said tubes, designated respectively by 17 and 18, being brought both nearer the main tube prior to use; inside the main tube is secured a frame comprising three crossmembers 19 and two plates 20; inside the secondary tube 17 is secured a rack 21 meshing, in the same manner as in the first embodiment, with a gear winding a driving spring 22 and connected with a regulator; the sole difference between this mechanism and the first embodiment consists in the fact that the driving spring 22 is fitted on the inner surface of one of the plates 20. The secondary tube 18 is also provided with a rack 23 winding another driving spring 24 acting through the agency of a gearing on the hammer 25 of an alarm, of which the bell is not illustrated; said hammer is normally held fast by a longitudinally slidable bolt 27 fitted on the outer surface of one of the plates 20 and cooperating with another longitudinally slidable bolt 28 secured to the secondary tube 17; when the latter is returned by the spring 22 into its outermost position, the bolt 28 disengages the bolt 27 and releases it from the hammer 25 which may thus hit the bell and thus signal the end of the stroke.

In the third embodiment, the spiral spring 7 or 22 of the two preceding embodiments, fitted on the frame of the train of gears, is replaced by a coil spring 29 housed inside the bottom of the main tube 30. To the secondary tube 31 are secured two flanges 32, of which one carries the rack 33, said flanges being interconnected at their inner ends opposed to the rack by a plate 34 engaging the spring 29. The rack 33, as in the preceding embodiments, engages a train of gears including the gear 37 and carried by the frame rigid with the main tube and the regulator of which is a lever 34 controlling through a toothed selector 35 a weight 36.

When the secondary tube 31 is urged over the tube 30, the plate 34 sets the spring 29 without the rack acting on the regulator 34, 35, 36, as provided by the gear 37 fitted with slight friction on its spindle. When the secondary tube 31 is released, the spring 29 urges said tube 31 outwardly through the agency of the train of gears under the control of the regulator.

In the embodiment illustrated in FIG. 7, the instrument is given the shape of a rod and is constituted by a casing 40 provided with a clip 41 which allows it to be carried in one's pocket after the manner of a propelling pencil or a fountain pen. It may in fact be designed so as to incorporate also a pencil or a fountain pen.

Inside the casing 40 is fitted the time metering mechanism including, inside a frame 42, a driving spring and a regulator gearing. 43 designates a rack adapted to be shifted axially inside the tubular casing 40, said rack carrying at its upper end a transverse control member 44 projecting outside the casing 40 through the slot 46 provided longitudinally in the latter and carrying a control knob 45 which latter is adapted to move along a scale 47 arranged along one of the edges of the slot 46.

Upon actuation of the knob 45 with a view to urging the rack downwardly, the latter winds the driving spring without acting on the regulator gearing. Upon release of the knob, the rack moves in the opposite direction and acts then on the regulator gearing as in the case of the preceding embodiments. The time during which the conversation lasts is defined by making the knob 45 stop in registry with a predetermined subdivision of the scale 47.

Lastly, the embodiment illustrated in FIG. 8 differs from that of FIG. 7 through the fact that the scale of minutes 48 is apparent to view through a gate 49 formed in the casing 40; the control member 44 provided as precedingly with a knob 45 moving inside the slot 46, carries a screen 50 which, according to the position of the rack, conceals all or part of the scale 48.

What I claim is:

1. A time-meter, chiefly for indicating the duration of telephone calls, comprising an elongated tubular casing including a main tube, two secondary tubes adapted to move longitudinally of the main tube near the corresponding ends thereof, a rack extending longitudinally of and rigid with each secondary tube, two trains of gears carried by the main tube and including each a gear wheel operatively connected with the corresponding rack and a spindle on which said gear wheel is fitted with slight friction, a pair of driving springs carried by the main tube and adapted to be stressed by the shifting of said corresponding secondary tube over the main tube, a regulator operatively connected with the spindle of one train of gears, an alarm hammer controlled by the other train of gears, a first bolt holding normally the hammer fast, a second bolt secured to the secondary tube carrying the rack corresponding to said one train of gears and adapted to release the first bolt for the maximum spacing of the two secondary tubes to allow operation of the hammer by the corresponding train of gears, the expansion of the springs upon release of the secondary tubes urging the racks and secondary tubes away from the main tube and actuating the train of gears respectively against the action of the regulator upon release of the first bolt, and means by which the shifting of the secondary tube carrying the rack cooperating with said one train of gears with reference to the main tube upon expansion of the corresponding spring indicates the time elapsed during said expansion.

2. A time meter chiefly for indicating the duration of telephone calls, comprising an elongated tubular casing closed at one end, said closed end being adapted to be rested against a supporting surface, time metering means within said casing including a gear train, a regulator, and a clockwork spring cooperating with said gearing and regulator, a tubular control member and indicator telescopingly fitted over and in sliding relationship with said casing, a rack rigid with said control and indicator member and extending longitudinally inside the casing and in engagement with said gearing, whereby it is adapted to wind said spring when moved out of an inoperative extended starting position upon shifting of the control member over the casing towards said supporting surface engaging end, the unwinding of the spring upon release of the control member shifting the rack and hence the control member gradually back into said extended starting position, and a scale on the outside of the casing cooperating with the control member to measure the shifting thereof in terms of elapsed time.

References Cited in the file of this patent

UNITED STATES PATENTS

| | | |
|---|---|---|
| D. 188,849 | Schwartzback | Feb. 4, 1960 |
| 1,108,636 | Starr | Aug. 25, 1914 |
| 1,170,473 | Barnett | Feb. 1, 1916 |
| 1,250,628 | Nishiyama | Dec. 18, 1917 |
| 1,694,059 | Denny | Dec. 4, 1928 |
| 2,358,791 | Collopy et al. | Sept. 26, 1944 |
| 2,468,541 | Bugeaud | Apr. 26, 1949 |
| 2,544,621 | Stelter | Mar. 6, 1951 |
| 2,596,856 | Krohn | May 13, 1952 |
| 2,599,112 | Krueger | June 3, 1952 |
| 3,059,342 | Beal | Oct. 23, 1962 |

FOREIGN PATENTS

| | | |
|---|---|---|
| 41,474 | Germany | Nov. 10, 1887 |
| 596,035 | Germany | Apr. 25, 1934 |